No. 806,059. PATENTED NOV. 28, 1905.
F. P. BURDGE.
CULTIVATOR, PLANTER, AND ROLLER.
APPLICATION FILED SEPT. 7, 1905.
2 SHEETS—SHEET 1.
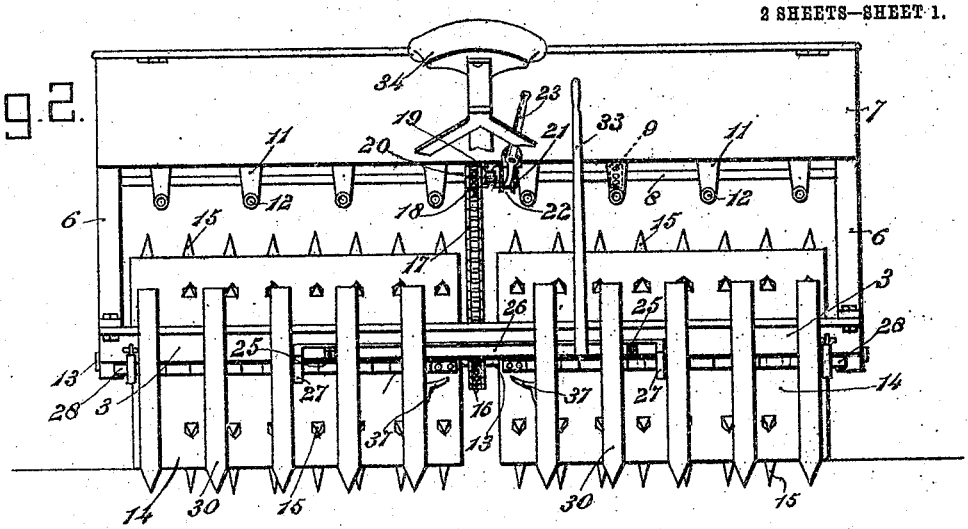
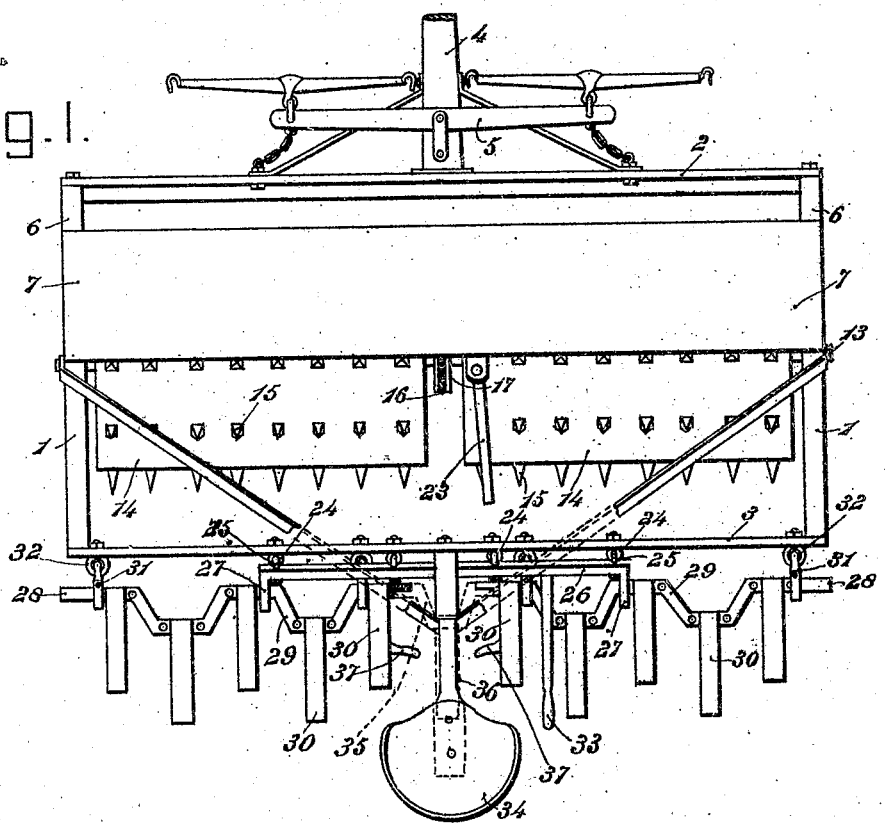
Witnesses
Franklin P. Burdge.
Inventor
by C. A. Snow & Co.
Attorneys No. 806,059. PATENTED NOV. 28, 1905.
F. P. BURDGE.
CULTIVATOR, PLANTER, AND ROLLER.
APPLICATION FILED SEPT. 7, 1905.

2 SHEETS—SHEET 2.

Franklin P. Burdge
Inventor

Witnesses by C. A. Snow & Co
Attorneys

UNITED STATES PATENT OFFICE.

FRANKLIN P. BURDGE, OF MUNCIE, INDIANA, ASSIGNOR OF ONE-THIRD TO ADDISON [...] HOPPES, OF MUNCIE, INDIANA.

CULTIVATOR, PLANTER, AND ROLLER.

No. 806,059.    Specification of Letters Patent.    Patented Nov. 28, 1905.

Application filed September 7, 1905. Serial No. 277,337.

*To all whom it may concern:*

Be it known that I, FRANKLIN P. BURDGE, a citizen of the United States, residing at Muncie, in the county of Delaware and State of Indiana, have invented a new and useful Cultivator, Planter, and Roller, of which the following is a specification.

This invention relates to implements for rolling and cultivating the soil, for planting seed, and for cultivating the young plants; and it has for its object to simplify and improve the construction and operation of this class of devices.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes and modifications within the scope of the invention may be made when desired.

Figure 3:
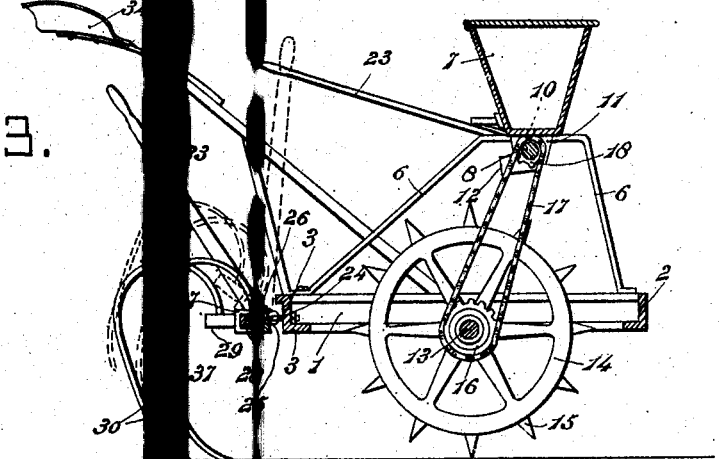
Figure 4:
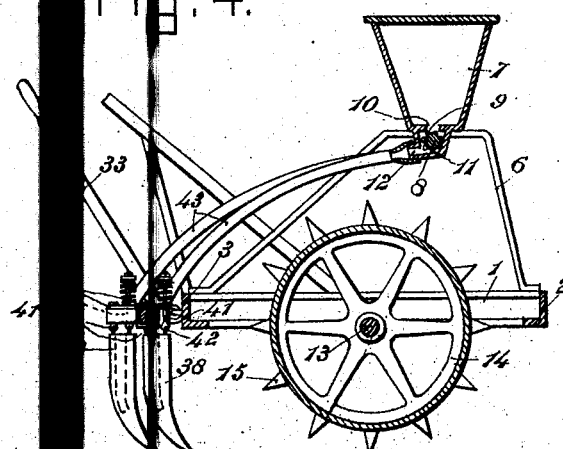

In said drawings, Figure 1 is a top plan view of an implement constructed in accordance with the principles of the invention. Fig. 2 is a rear elevation of the same. Fig. 3 is a sectional elevation, and Fig. 4 is a sectional elevation illustrating a modification.

Corresponding parts in the several figures are indicated throughout by similar characters of reference.

The frame of the improved implement has been shown of rectangular shape, the same being composed of the side members 1 1 and front and rear cross-bars 2 and 3, to the former of which is attached a draft member, here illustrated as consisting of a tongue 4 and an equalizer 5 supported thereon. The side members of the frame support a pair of arches or inverted yokes 6 6, carrying a seed-box 7, adjacent to the bottom of which a shaft 8 is supported for rotation, said shaft being provided with corrugated wheels or cylinders 9, operating adjacent to the feed-openings 10 in the bottom of the seedbox, said rollers being disposed within discharge-spouts 11, provided in their rear sides with discharge-openings 12.

A shaft or axle 13, supported for rotation in the side members of the frame, is equipped with a pair of spaced rollers 14, provided with clod-crushing spikes 15. The shaft 13 carries between the rollers a sprocket-wheel 16, which is connectd by a chain 17 with a sprocket-wheel 18, which is mounted loosely upon the shaft 8 and which has a clutch member 19 capable of engagement with a clutch member 20 upon a sleeve 21, which is feathered upon the shaft 8. The sleeve 21 has an annular groove 22, engaged by a bifurcated shipping-lever 23, whereby it may be thrown into or out of engagement with the sprocket-wheel 18, thus enabling the latter and the shaft 8 to be driven from the axle 13.

The rear frame member 3 is provided with a plurality of eyebolts 24, hingedly connected with eyebolts 25, connected with a bar 26, which is thereby hingedly connected with the main frame. The bar 26 is provided at the ends thereof with rearwardly-extending brackets 27, supporting a rod or bar 28, which is of zigzag shape, or provided with a plurality of oppositely-extending cranks 29, upon each of which a spring harrow-tooth or cultivator-tooth 30 is secured, said teeth being thus arranged in staggered or zigzag order. The extremities of the rod or bar 28 are provided with eyebolts or hook members 31, engaging eyebolts 32 near the ends of the rear cross-bar 3 of the frame, thus reinforcing the ends of the rod or bar 28.

The bar 26 is provided with a hand-lever 33, whereby it may be raised sufficiently to elevate the harrow or cultivator teeth from ground-engaging position when desired. A suitably-supported seat 34 is provided, the same being located in such a position that the operator may readily manipulate the lever 33.

The zigzag bar 28 includes a central detachable member 35, carrying a harrow or cultivator tooth 36, which operates in rear of the space between the rollers 14. When it is desired to cultivate growing plants, the central member or section is detached, as shown in Fig. 2, so that the implement may be used successfully as a cultivator for young plants.

The harrow or cultivator teeth 30 adjacent to the central tooth are provided upon their inner sides with foot-rests 37, which serve not only as supports for the feet of the operator, but which enable the operator to push said teeth in an outward direction when desired in order to avoid injury to the plants. It is obvious that the teeth or blades are intended to be possessed of sufficient resiliency to enable them to be thus displaced.

In Fig. 4 there is illustrated a modification under which the harrow or cultivator teeth are detached from the rod or bar 28, and in their place are substituted drill-tubes 38, which are hingedly connected with their supporting-bolts 39, which latter also serve to secure in position the plates 40, which are forwardly extended and provided with apertures for the passage of spring-actuated rods 41, which have hinge connection with brackets 42, extending upwardly from the front sides of the drill-tubes, which latter are thus permitted to yield in a rearward direction if obstructions should be encountered. The seed may be conveyed to the tubes 38 through flexible tubes 43, connected with the apertures 12 of the spouts 11.

From the foregoing description, taken in connection with the drawings hereto annexed, the operation and advantages of this invention will be readily understood by those skilled in the art to which it appertains. By the crushing action of the rollers the soil will be leveled and crushed, and the cultivator or harrow teeth will serve to stir and agitate the surface of the soil and to displace weeds and grass, thus preparing the ground for the reception of seed, which by simply substituting the drill-tubes for the earth-engaging teeth or blades may be drilled into the ground. The seed-drills may be used when desired without previous preparation of the ground other than that of the spiked rollers. By removing the central section of the zigzag rod or bar the implement may be successfully utilized for cultivating the young crop.

Having thus described the invention, what is claimed is—

1. In an implement of the class described, a frame, spiked rollers supported for rotation in said frame, a bar connected hingedly with the rear cross-bar of said frame and having rearward-extending brackets, and a zigzag bar supported in said brackets; said zigzag bar including a detachable central tool-carrying section.

2. In an implement of the class described, a frame, spiked rollers supported for rotation in said frame, a hinged bar connected with the rear cross-bar of said frame and having rearward-extending brackets, a tool-carrying bar of zigzag formation supported in said brackets, and additional means for hingedly connecting the ends of the zigzag bar with the rear frame-bar.

3. In an implement of the class described, a frame, spiked rollers supported for rotation in said frame, a supporting-bar connected hingedly with the rear cross-bar of the frame and having rearward-extending brackets and a hand-lever, a zigzag bar supported in the brackets of the supporting-bar, auxiliary means for hingedly connecting the ends of the zigzag bar with the rear cross-bar of the frame, and tools connected, in staggered order, with the zigzag bar; the latter including a detachable central tool-carrying section.

In testimony that I claim the foregoing as my own I have hereto affixed my signature in the presence of two witnesses.

FRANKLIN P. BURDGE.

Witnesses:
A. C. SILVERBURG,
FRANK GRAFF.